Dec. 16, 1969     E. P. BULAN ET AL     3,484,346
METHOD OF MAKING ELECTRIC BATTERY ELECTRODES
Filed May 24, 1966
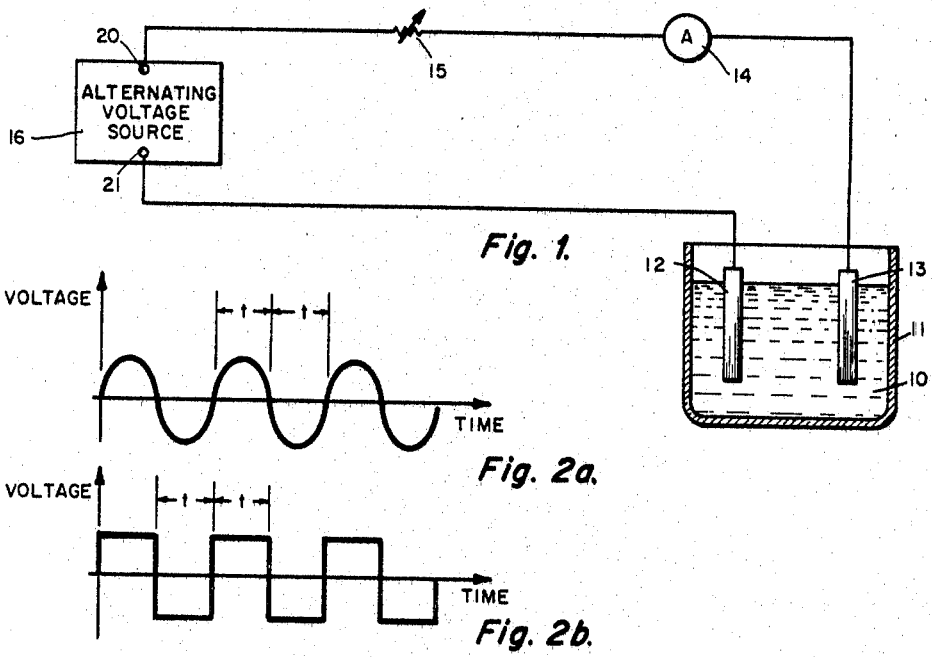
Fig. 1.
Fig. 2a.
Fig. 2b.
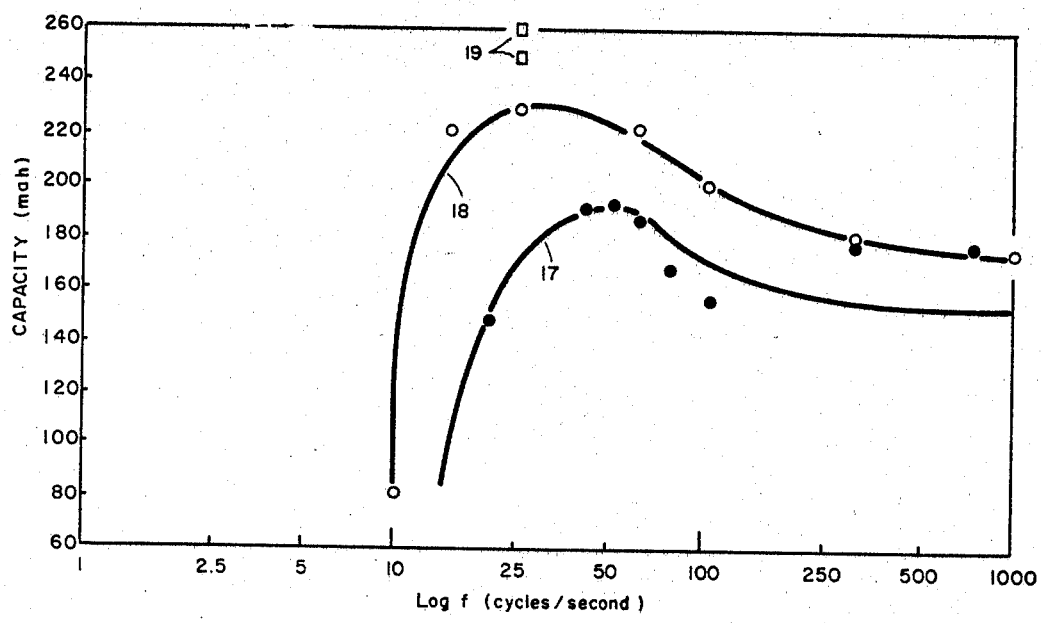
Fig. 3.
INVENTORS.
FREDERICK P. KOBER
EDWARD P. BULAN
BY
R. J. Frank
ATTORNEY.

United States Patent Office 3,484,346
Patented Dec. 16, 1969

3,484,346
METHOD OF MAKING ELECTRIC BATTERY ELECTRODES
Edward P. Bulan, Syosset, and Frederick P. Kober, Bayside, N.Y., assignors to General Telephone & Electronics Laboratories Incorporated, a corporation of Delaware
Filed May 24, 1966, Ser. No. 552,450
Int. Cl. B01k 3/04, 1/00
U.S. Cl. 204—56          14 Claims

ABSTRACT OF THE DISCLOSURE

A method of making battery electrodes by immersing a pair of electrically-conductive porous plaques in a cadmium salt solution and then passing alternating current between the plaques. The current acts to impregnate the pores of each plaque with cadmium hydroxide.

---

This invention relates to a method of manufacturing electric battery electrodes and, in particular, to a method of making negative electrodes for secondary alkaline batteries.

In the manufacture of an alkaline battery, the electrode capacity is determined by the surface area of the active material. To maximize surface area, the active material is typically formed within the pores of a suitable porous sintered conductive plaque. While in theory, zinc, iron, and cadimum, exhibit those properties desired in a negative electrode, it has been found that zinc and iron impregnated plaques result in the formation of individual galvanic cells within each electrode. This has been found to cause severe corrosion of the electrode and the evolution of gas from the battery. In addition, zinc hydroxide is soluble in alkaline solutions and is therefore not suitable for impregnated negative electrodes.

As a result, cadmium negative electrodes are employed in secondary alkaline batteries in combination with a nickel positive electrode. In the manufacture of an alkaline battery of the nickel-cadmium type, the negative electrode in each cell is conventionally formed by immersing a porous conductive plaque in a saturated solution of a cadmium salt, typically cadmium nitrate, and leaving it in the bath until the pores of the plaque have become impregnated with the solution. The plaque is then removed from the bath and placed in a strong alkaline solution, for example potassium or sodium hydroxide, whereupon it is cathodically polarized. By cathodically polarized, it is meant that the plaque is made negative with respect to a counter electrode also immersed in the alkaline bath. A direct current source is coupled between the plaque and the counter electrode and the current is adjusted to provide a current density sufficiently high to promote the vigorous evolution of gas. The evolved gas results from the reduction of water molecules to form hydroxyl ions and hydrogen. The cadmium nitrate solution within the pores is converted by the hydroxyl ions to cadmium hydroxide.

In order to obtain sufficient cadmium hydroxide within the pores of the negative electrode, it has been found necessary to repeat his procedure five or more times requiring a total time of about 40 hours. It is important that the cadmium salt solution not be contaminated by the alkali bath and therefore careful washing and handling of the impregnated plaque is essential during each cycle. In the case of a nitrate solution and a potassium hydroxide bath, insufficient washing has been found to result in the formation of efflorescences of potassium carbonate during the drying. Sufficient washing has been found to take several hours. Due to its inherent discontinuities, the process tends to become both time-consuming and expensive.

An additional disadvantage arises from the fact that for each working electrode, a counter-electrode is provided. Thus, the process is only half as efficient as an equivalent process wherein both electrodes can be impregnated and the counter-electrode eliminated.

Accordingly, an object of the present invention is the provision of a continuous method of making negative electrodes for alkaline storage batteries in which the number of steps is substantially reduced.

A further object is to provide a method for making negative electrodes in which both electrodes may be working electrodes and the need for a counter-electrode is obviated.

An additional object is to provide a method for making negative electrodes which is faster and more efficient than known methods.

In accordance with the present invention, two porous electrically conducting plaques are immersed in a saturated solution of a cadmium salt. Each plaque is coupled to one terminal of a two terminal alternating current source. As a result, alternating current flows through the circuit comprising the two conducting plaques and the bath until the pores of each plaque are impregnated with an insoluble cadmium compound consisting essentially of cadmium hydroxide. The time required in order to obtain a desired capacity for a particular conductive plaque is determined by the frequency, waveform and magnitude of this alternating current.

The term "plaque" refers to an electrically conductive porous structure for use as a support for the active material in a nickel-cadmium secondary cell. It is usually made of sintered nickel powder although metal wood, felted metal fiber or graphite may also be used. One method of making the plaque consists of heating fine nickel powder (such as powder prepared by the decomposition of nickel carbonyl) in a reducing atmosphere until the particles adhere to one another and to a nickel screen support web. The porosity of plaques suitable for use as battery electrodes is approximately 80 percent.

The saturated solution of a cadmium salt, typically cadmium nitrate $Cd(NO_3)_2$ is prepared by dissolving cadmium nitrate in distilled water at room temperature. Sufficient cadmium nitrate is added until a specific gravity of approximately 1.60 is obtained.

The lower value of the pH of the bath is determined by the properties of the material employed in the conductive plaques. For materials such as platinum which are essentially inert, the pH of the bath is of minor importance. However, when nickel plaques, which are substantially less expensive, are immersed in the cadmium nitrate bath, the pH of the bath must be controlled to prevent corrosion. The bath has a large amount of free nitric acid due to the dissociation of $Cd(NO_3)_2$ and therefore, tends to be strongly acidic. The nickel plaques are found to corrode in a strongly acidic bath since nickel prefers the ionic state at low pH's and goes into solution. In practice, the pH of the bath is maintained at a value of at least 3 and preferably 3.5 to minimize this corrosion.

As the pH of the bath increases, i.e., becomes more basic, cadmium hydroxide $Cd(OH)_2$ begins to precipitate in regions other than within the pores of the plaque and active material is lost in the bath. This effect can be substantially eliminated by selecting the initial pH of the bath to be a least as low as 4.0. Thus, the initial pH range for nickel baths is 3.0 to 4.0 while for other plaque materials, the lower limit is determined by the oxidation potential of the plaque material.

When the bath has been prepared, two porous plaques are immersed therein. Each plaque is coupled to one terminal of an alternating current source so that each plaque alternately conducts current in the positive and negative directions. The intervals of alternate conduction are equal and the current waveform symmetrical about the zero axis so that the time average current through each plaque is zero. By utilizing a symmetrical waveform, each plaque is impregnated within an equivalent amount of cadmium hydroxide per unit time.

During the time that the current is applied, cadmium hydroxide is continuously being deposited in the pores of one or the other of the plaques. When a plaque is conducting current in the negative direction, the water within the pores of the plaque is electrolyzed to form hydroxy ions so that within the plaque the pH of the solution is increased, i.e., becomes more basic, and cadmium hydroxide $Cd(OH_2)$ forms in situ within the pores. As a result, the plaque becomes impregnated with active material.

When a plaque is conducting current in the positive direction the impregnation of this plaque is believed to cease and the pH of the solution within the plaque returns to essentially its initial value. During the positive portion of the cycle, oxygen is found to be liberated which increases the acidity of the solution. However, the already formed cadmium hydroxide is essentially undisturbed by the oxygen since it is in its highest valence state and is not capable of being further oxidized. As a result of this A.C. operation and the absence of any D.C. component, the pH of the solution remains essentially constant.

The present method of impregnation is continuous in that the need for repeated immersions in two baths, and the accompanying multiple washing and drying steps is eliminated. The alternating current is continued until the desired degree of impregnation is achieved. The total time required for a given degree of impregnation depends on the frequency, waveform and the peak magnitude of the current. Further, an inherent limitation on the efficiency of previous methods of impregnation has been eliminated since the present process enables two electrodes to be simultaneously impregnated during operation.

Both square-wave and sinusoidal alternating current have yielded efficient impregnation in the present process. While the process has been found to provide satisfactory impregnation over a wide range of frequencies, 10 to 1000 cycles per second, the preferred range of frequencies is found to be 15 to 60 c.p.s. for sinusoidal waveforms.

The absence of any direct current flowing between the plaques enables the impregnation to be carried out without requiring continuous correction of the pH of the bath. In previous methods of impregnating plaques, it is necessary to continuously add acid to the bath to prevent precipitation of the cadmium hydroxide within the bath at a point remote from the plaque.

Furthermore, methods of impregnation utilizing direct current sources have been found to provide a plating of the plaque rather than distribution of the cadmium hydroxide precipitate within the pores of the plaque. The power output of a battery is determined in part by the amount of active material in contact with the electrolyte. The amount of active material is directly related to the surface area of the active material and, therefore, it is desirable to eliminate any plating effects during impregnation. The failure to eliminate plating reduces the surface area of the impregnated plaque to its apparent surface area, i.e., that determined from the outside dimensions of the plaque, and minimizes the electrode capacity. The present method of impregnation utilizing an alternating current having a time average value of zero has been found to provide substantially high electrode capacities in a relatively short period with encountering the plating effect produced by direct current techniques.

Further features and advantages of the invention will become more readily apparent from the following detailed description of specific embodiments of the invention taken in conjunction with the accompanying drawings, in which:

FIG. 1 is a schematic view of the apparatus used in carrying out the present invention.

FIGS. 2a and 2b show representative voltage waveforms.

FIG. 3 is a graph showing the relationship between the frequency of the alternating current and the capacity of the electrode.

Referring now to FIG. 1, tank 11 contains a bath 10 comprising a saturated solution of a cadmium salt, such as cadmium nitrate $Cd(NO_3)_2$. By a saturated cadmium nitrate solution is meant a solution having a specific gravity of 1.60 or greater at 25° C.

First and second porous conductive plaques 12 and 13 are immersed in bath 10. The plaques, which may be formed of sintered nickel having a porosity of about 80%, are working electrodes in that each is to be impregnated with active material, for example cadmium hydroxide. Each plaque is coupled to one terminal of alternating voltage source 16. As shown, plaque 12 is connected directly to terminal 21 of source 16 while plaque 13 is coupled to terminal 20 through ammeter 14 and variable resistor 15.

The waveform of the alternating voltage appearing between terminals 20 and 21 of source 16 may be either sinusoidal or square wave as shown in FIGS. 2a and 2b respectively. However, other waveforms may be used if the duration $t$ of adjacent half-cycles are equal and the waveform is symmetrical about the zero axis. The use of a symmetrical waveform insures that the time average voltage applied between the plaques and the time average current flow therethrough is zero.

The current flowing through the circuit has the same waveform as that of the voltage appearing between terminals 20 and 21. The magnitude of the alternating current flowing through plaques 12 and 13 is controlled by adjusting resistor 15. Resistor 15 is adjusted so that the product of the applied current and the bath resistance exceeds the decomposition voltage of the bath. The symmetrical nature of the alternating current insures that no direct current component flows between plaques 12 and 13. The decomposition voltage is determined primarily by the concentration of the bath and the plaque material and is characterized by the evolution of hydrogen gas from the bath. However, the magnitude of the current has a practical upper limit which if exceeded produces excessive heating of the bath. If the temperature of the bath exceeds about 50° C., the plaques begin to corrode heavily and cadmium and nickel hydroxides are found to precipitate in the bath.

During the interval that a plaque is negative, the solution within the pores is electrolyzed to form hydroxyl ions and liberate hydrogen which increases the pH of the bath within the pores. These ions combine with the cadmium ions to form a cadmium hydroxide. The hydroxide is a precipitate which deposits on the surfaces of the pores. When the plaque becomes positive, i.e., the direction of current flow reverses, oxygen is observed to be liberated at the electrode. This evolution of oxygen is found to not disturb the already formed cadmium hydroxide. The $Cd(OH)_2$ is incapable of being further oxidized since the cadmium has no higher valence state available. In addition, the liberation of the oxygen operates to increase the net balance of hydrogen ions in the bath proximate to the plaque. As a result, the pH is decreased from the value attained at the completion of the negative half-cycle toward its initial value. This restoring tendency exhibited by the present process enables both plaques to be impregnated without continuously monitoring and controlling the pH of the bath. The resulting impregnated plaques are then removed from the bath and cathodically charged in a conventional manner in a potassium or sodium hydroxide solution following which they are washed with deionized water at approximately 70° C. and dried at 80° C. in air.

The results of several applications of the process wherein nickel plaques having a porosity of about 80% and dimensions of 2.5 by 0.5 by 0.025 inches were immersed in a saturated solution of cadmium nitrate and different alternating currents caused to flow therebetween are shown by curves 17 and 18 of FIG. 3. The curve 17 indicates the capacity for constant current discharge in milliampere-hours of electrodes having a sinusoidal current of 0.7 amp flowing therebetween during an impregnation period of 1.5 hours. Curve 18 is for electrodes subjected to similar tests but with the current during impregnation being raised to 1.0 amp. The temperature of the baths rose during impregnation from room temperature to 45° C. whereupon the temperature remained constant. While substantial capacities are attained throughout the frequency range of 10 to 1000 c.p.s., the preferred range is from 15 to 60 c.p.s. The points 19 of FIG. 3 correspond to the results obtained after 1.5 hours with an applied square-wave current having a magnitude of 2.5 amps. The electrode capacities of FIG. 3 were determined by measuring the duration of a constant 100 milliampere discharge current of individual electrodes following a conventional 3 hour-100 milliampere charge. In terms of ampere-hours per cubic inch of the apparent volume of a plaque, the present method is found to provide capacities within the range of 8.2 to 8.9.

The decrease in capacity with decreasing frequency observed in FIG. 3 is due to the tendency of the porous plaques to become plated with cadmium hydroxide rather than impregnated. The plating reduces electrode capacity by reducing the effective surface area of the precipitated cadmium hydroxide. This reduction is due to the sealing of the pores by the plating layer. In tests performed as above with a direct current of 0.6 amp flowing between the plaques, the cathodic plaque was found to be plated after a period of a few minutes rendering it unsuitable for use as a battery electrode. The anodic plaque was found to be severely corroded with a weight loss of 15%. After an impregnating period of 2 hours, neither plaque possessed any measurable capacity.

While the above description of the invention has referred to specific embodiments thereof, it will be apparent that many variations and modifications may be made therein without departing from the spirit and scope of the invention.

What is claimed is:
1. A method of making battery electrodes comprising the steps of
    (a) immersing first and second electrically conducting porous plaques in a cadmium salt solution, and
    (b) applying an alternating current having a frequency of at least 10 c.p.s. to said first and second plaques, said alternating current impregnating the pores of each of said plaques with an insoluble cadmium compound consisting essentially of cadmium hydroxide.
2. The method of claim 1 in which said alternating current has a time average value of zero.
3. The method of claim 2 in which said alternating current has a waveform that is symmetrical about the zero axis.
4. The method of claim 3 in which said alternating current has a frequency within the range of 10 to 1000 c.p.s.
5. The method of claim 4 in which said alternating current has a sinusoidal waveform.
6. The method of claim 5 in which said alternating current has a frequency within the range of 15 to 60 c.p.s.
7. The method of claim 6 in which said alternating current has a square waveform.
8. The method of claim 7 in which said alternating current has a frequency of about 25 c.p.s.
9. The method of claim 8 in which said cadmium salt solution has a pH at least as low as 4.0.
10. A method of making a negative electrode for an alkaline battery comprising the steps of
    (a) preparing a saturated solution of a cadmium salt, said solution having a pH within the range of 3.0 to 4.0;
    (b) immersing first and second porous nickel plaques in said solution; and
    (c) coupling said first and second plaques to the first and second terminals respectively of an alternating current source whereby an alternating current is applied to said plaques, said alternating current having a frequency of at least 10 c.p.s. and a time average value of zero, said current impregnating the pores of each of said plaques with an insoluble cadmium compound consisting essentially of cadmium hydroxide.
11. The method of claim 10 in which said cadmium salt is cadmium nitrate.
12. The method of claim 11 in which said alternating current has a frequency within the range of 10 to 1000 c.p.s.
13. The method of claim 12 further comprising the step of cathodically charging said impregnated plaques in a hydroxide solution.
14. The method of claim 13 in which said alternating current has a frequency within the range of 15 to 60 c.p.s.

References Cited

UNITED STATES PATENTS

| | | | |
|---|---|---|---|
| 2,366,402 | 1/1945 | Hauel | 204—56 |
| 3,214,355 | 10/1965 | Kandler | 204—56 |
| 748,609 | 1/1904 | Hunt | 204—96 |

JOHN H. MACK, Primary Examiner

R. L. ANDREWS, Assistant Examiner

U.S. Cl. X.R.

204—96